I. Carman,
Horseshoe.
No. 70,954. Patented Nov. 19, 1867.
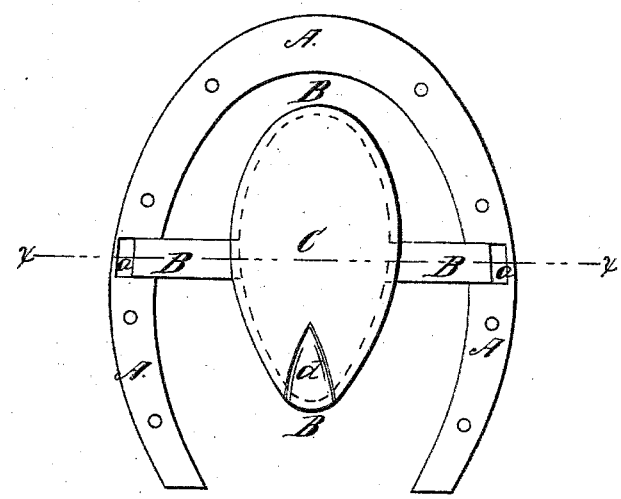
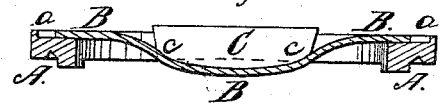
Witnesses.
Theo Frische,
J. A. Service
Inventor:
Isaac Carman
Per Wixom
Attorney

United States Patent Office.

IRVINE CARMAN, OF SCHOOLCRAFT, MICHIGAN.

*Letters Patent No. 70,954, dated November 19, 1867.*

IMPROVEMENT IN HORSE-SHOES.

*The Schedule referred to in these Letters Patent and making part of the same.*

TO ALL WHOM IT MAY CONCERN:

Be it known that I, IRVINE CARMAN, of Schoolcraft, in the county of Kalamazoo, and State of Michigan, have invented a new and improved Snow Horse-Shoe; and I do hereby declare that the following is a full, clear, and exact description thereof, which will enable others skilled in the art to make and use the same, reference being had to the accompanying drawings, forming part of this specification.

This invention relates to an improvement in snow horse-shoes, and consists of a spring placed beneath the hoof, with a rubber between it and the hoof. In the accompanying drawings—

Figure 1 is a top view of my improved snow horse-shoe, and

Figure 2 a section thereof through the spring and rubber at the line $x\ x$.

Similar letters of reference indicate like parts.

A is the ordinary horse-shoe; B is a spring of steel or other suitable material expanding in the form of the bowl of a table-spoon, as shown in the drawing, and fitting into the mortises $a\ a$ in the walls of the shoe, having a play of about one-fourth of an inch at each end. C is a soft oblong rubber fitting upon the bowl of the spring, and having on its under side a groove, $c\ c$, on each side of the rubber C, to fit the spring B, by which it is locked in place. $d$ is a depression in the rubber to fit the hoof, against which it sets snugly. Being a trifle higher than the upper surface of the shoe, no dirt can collect between the hoof and the spring. The shoe being adjusted, having the spring and rubber in place, when the weight of the horse is on the spring, the rubber gives by the pressure of the latter, but when the foot is lifted, the steel spring flies back and throws off any snow which may have collected.

What I claim as new, and desire to secure by Letters Patent, is—

1. The spring B, fitting into the walls of the shoe, substantially as shown and described.
2. The combination of the rubber C with the spring B, substantially as shown and described.

IRVINE CARMAN.

Witnesses:
 C. F. WHEELER,
 GEO. R. JAMES.